United States Patent
Reda et al.

(10) Patent No.: US 10,685,438 B2
(45) Date of Patent: Jun. 16, 2020

(54) AUTOMATED MEASUREMENT BASED ON DEEP LEARNING

(71) Applicant: Siemens Healthcare GmbH, Erlangen (DE)

(72) Inventors: Fitsum Aklilu Reda, West Chester, PA (US); Yiqiang Zhan, West Chester, PA (US); Parmeet Singh Bhatia, Frazer, PA (US); Yoshihisa Shinagawa, Downingtown, PA (US); Luca Bogoni, Philadelphia, PA (US); Xiang Sean Zhou, Exton, PA (US)

(73) Assignee: Siemens Healthcare GmbH, Erlangen (DE)

( * ) Notice: Subject to any disclaimer, the term of this patent is extended or adjusted under 35 U.S.C. 154(b) by 128 days.

(21) Appl. No.: 16/016,776

(22) Filed: Jun. 25, 2018

(65) Prior Publication Data
US 2019/0019287 A1    Jan. 17, 2019

Related U.S. Application Data (60) Provisional application No. 62/533,266, filed on Jul. 17, 2017.

(51) Int. Cl.
*G06K 9/00* (2006.01)
*G06T 7/00* (2017.01)
(Continued)

(52) U.S. Cl.
CPC .......... *G06T 7/0012* (2013.01); *G01B 21/20* (2013.01); *G06K 9/4628* (2013.01); *G06K 9/627* (2013.01); *G06N 20/00* (2019.01); *G06T 7/12* (2017.01); *G06T 7/60* (2013.01); *G06T 7/62* (2017.01); *G06T 7/66* (2017.01);
(Continued)

(58) Field of Classification Search
CPC .......... G01B 21/20; G06T 2207/20081; G06T 2207/30048; G06T 7/0012; G06T 7/12; G06T 7/60; G06T 7/66; G06T 2200/24; G06T 2207/10081; G06T 2207/20084; G06T 2207/30101; G06T 2207/30172; G06T 7/62; G06K 2209/051; G06K 9/4628; G06K 9/627; G06N 20/00; G06N 99/005
See application file for complete search history.

(56) References Cited

U.S. PATENT DOCUMENTS

| | | | | |
|---|---|---|---|---|
| 2007/0297561 | A1* | 12/2007 | Breeuwer | G06T 7/149 378/4 |
| 2011/0026793 | A1* | 2/2011 | Goel | G06T 7/60 382/131 |
| 2016/0260213 | A1 | 9/2016 | Reda et al. | |

OTHER PUBLICATIONS

Zhang, Hong, Vitaly O. Kheyfets, and Ender A. Finol. "Robust infrarenal aortic aneurysm lumen centerline detection for rupture status classification." Medical engineering & physics 35.9 (2013): 1358-1367.
(Continued)

*Primary Examiner* — Tom Y Lu (57) ABSTRACT

A framework for automated measurement. In accordance with one aspect, the framework detects a centerline point of a structure of interest in an image. A centerline of the structure of interest may be traced based on the detected centerline point. A trained segmentation learning structure may be used to generate one or more contours of the structure of interest along the centerline. One or more measurements may then be extracted from the one or more contours.

20 Claims, 10 Drawing Sheets

(51) Int. Cl.
*G01B 21/20* (2006.01)
*G06T 7/12* (2017.01)
*G06T 7/60* (2017.01)
*G06T 7/66* (2017.01)
*G06N 20/00* (2019.01)
*G06K 9/62* (2006.01)
*G06T 7/62* (2017.01)
*G06K 9/46* (2006.01)

(52) U.S. Cl.
CPC .... *G06K 2209/051* (2013.01); *G06T 2200/24* (2013.01); *G06T 2207/10081* (2013.01); *G06T 2207/20081* (2013.01); *G06T 2207/20084* (2013.01); *G06T 2207/30048* (2013.01); *G06T 2207/30101* (2013.01); *G06T 2207/30172* (2013.01)

(56) References Cited

OTHER PUBLICATIONS

Moeskops, Pim, et al. "Deep learning for multi-task medical image segmentation in multiple modalities." International Conference on Medical Image Computing and Computer-Assisted Intervention. Springer, Cham, 2016.

Bodur, Osman, et al. "Semi-automatic aortic aneurysm analysis." Medical imaging 2007: physiology, function, and structure from medical images. vol. 6511. International Society for Optics and Photonics, 2007.

Hager, Alfred, et al. "Diameters of the thoracic aorta throughout life as measured with helical computed tomography." The Journal of thoracic and cardiovascular surgery 123.6 (2002): 1060-1066.

Erbel, Raimund, and Holger Eggebrecht. "Aortic dimensions and the risk of dissection." Heart 92.1 (2006): 137-142.

O'Rourke, Michael, Alan Farnsworth, and John O'Rourke. "Aortic dimensions and stiffness in normal adults." (2008): 749-751.

Hiratzka, et al., "2010 ACCF/AHA/AATS/ACR/ASA/SCA/SCAI/SIR/STS/SVM Guidelines for the Diagnosis and Management of Patients With Thoracic Aortic Disease: Executive Summary", https://doi.org/10.1161/CIR.0b013e3181d47d48 ,Circulation.2010;121:1544-1579, Originally published Apr. 5, 2010.

Ronneberger, Olaf, Philipp Fischer, and Thomas Brox. "U-net: Convolutional networks for biomedical image segmentation." International Conference on Medical image computing and computer-assisted intervention. Springer, Cham, 2015.

Long, Jonathan, Evan Shelhamer, and Trevor Darrell. "Fully convolutional networks for semantic segmentation." Proceedings of the IEEE conference on computer vision and pattern recognition. 2015.

Bruce Margolis, DO, MBA,"The Thoracic Aorta", 2010, http://emedicine.medscape.com/article/242904=print, 34 pages.

* cited by examiner

AUTOMATED MEASUREMENT BASED ON DEEP LEARNING

CROSS-REFERENCE TO RELATED APPLICATION

The present application claims the benefit of U.S. provisional application No. 62/533,266, filed Jul. 17, 2017, the entire contents of which are herein incorporated by reference.

TECHNICAL FIELD

The present disclosure generally relates to digital medical image data processing, and more particularly to automated measurement based on deep learning.

BACKGROUND

The field of medical imaging has seen significant advances since the time X-Rays were first used to determine anatomical abnormalities. Medical imaging hardware has progressed from modern machines, such as Magnetic Resonance (MR) imaging scanners, Computed Tomographic (CT) scanners and Positron Emission Tomographic (PET) scanners, to multimodality imaging systems such as PET-CT and PET-MRI systems. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a computerized axial tomography (CAT) scanner, magnetic resonance imaging (MRI), etc. Digital medical images are typically either a two-dimensional ("2D") image made of pixel elements, a three-dimensional ("3D") image made of volume elements ("voxels") or a four-dimensional ("4D") image made of dynamic elements ("doxels"). Such 2D, 3D or 4D images are processed using medical image recognition techniques to determine the presence of anatomical abnormalities or pathologies, such as cysts, tumors, polyps, aneurysms, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image are generally referred to as Computer-Aided Detection (CAD). A CAD system can process medical images, localize and segment structure of interests, including possible abnormalities (or candidates), for further review. Recognizing structures of interest within digitized medical images presents multiple challenges. For example, a first concern relates to the accuracy of recognition of structures of interest within an image. A second area of concern is the speed of recognition. Because medical images are an aid for a doctor to diagnose a disease or condition, the speed with which an image can be processed and structures within that image recognized can be of the utmost importance to the doctor in order to reach an early diagnosis.

CAD may be used to facilitate diagnosis of aortic aneurysms and guide therapeutic decisions. Aortic aneurysm is one of the top fifteen causes of death. An aortic aneurysm is an abnormal bulge within the wall of the aorta. The aorta is the largest artery in the body that carries blood from the heart to the body. Aortic aneurysms may occur anywhere in the aorta. An abdominal aortic aneurysm occurs along a portion of the aorta that passes through the abdomen, while a thoracic aortic aneurysm occurs along a portion of the aorta that passes through the chest cavity. Having an aortic aneurysm increases the risk of developing an aortic dissection or rupture, which can be fatal. Early and accurate diagnosis is key to reducing risk of death.

SUMMARY

Described herein is a framework for automated measurement. In accordance with one aspect, the framework detects a centerline point of a structure of interest in an image. A centerline of the structure of interest may be traced based on the detected centerline point. A trained segmentation learning structure may be used to generate one or more contours of the structure of interest along the centerline. One or more measurements may then be extracted from the one or more contours.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed; on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to high-resolution computed tomography (HRCT), x-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displayed as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

The present framework provides a system and method for automated measurement of a structure of interest. More particularly, measurements may be extracted along the centerline (or length) of the structure of interest using deep learning techniques. In some implementations, measurements are extracted along the centerline of an aorta. Typically, aorta measurements are extracted at nine clinically standard points along the length of the aorta: (1) aortic sinuses of Valsalva; (2) sinoanatomical junction; (3) mid ascending aorta (midpoint in length between Nos. 2 and 4); (4) proximal aortic arch (aorta at the origin of the innominate artery); (5) mid aortic arch (between left common carotid and subclavian arteries); (6) proximal descending thoracic aorta (begins at the isthmus, approximately 2 cm distal to left subclavian artery); (7) mid descending aorta (midpoint in length between Nos. 6 and 8); (8) aorta at diaphragm (2 cm above the celiac axis origin); and (9) abdominal aorta at the celiac axis origin. These nine clinically standard points are determined by the American College of Cardiology and American Heart Association (ACC-AHA). The present framework enables aorta measurements not only at these nine standard points, but at any or all points continuously along the length of the aorta. This advantageously minimizes the risk of missing important measurements between these nine standard points.

These measurements may be compared to measurements obtained from a population of subjects. Using a population of such measurements extracted offline from many populations of patients, relevant information about the state of the structure of interest may be studied. For instance, measurements that are outside the statistical bands of population measurements may be detected and further studied for possible presence of abnormalities or complications that may arise due to such abnormalities. These and other exemplary features and advantages will be described in more detail herein.

Figure 1:
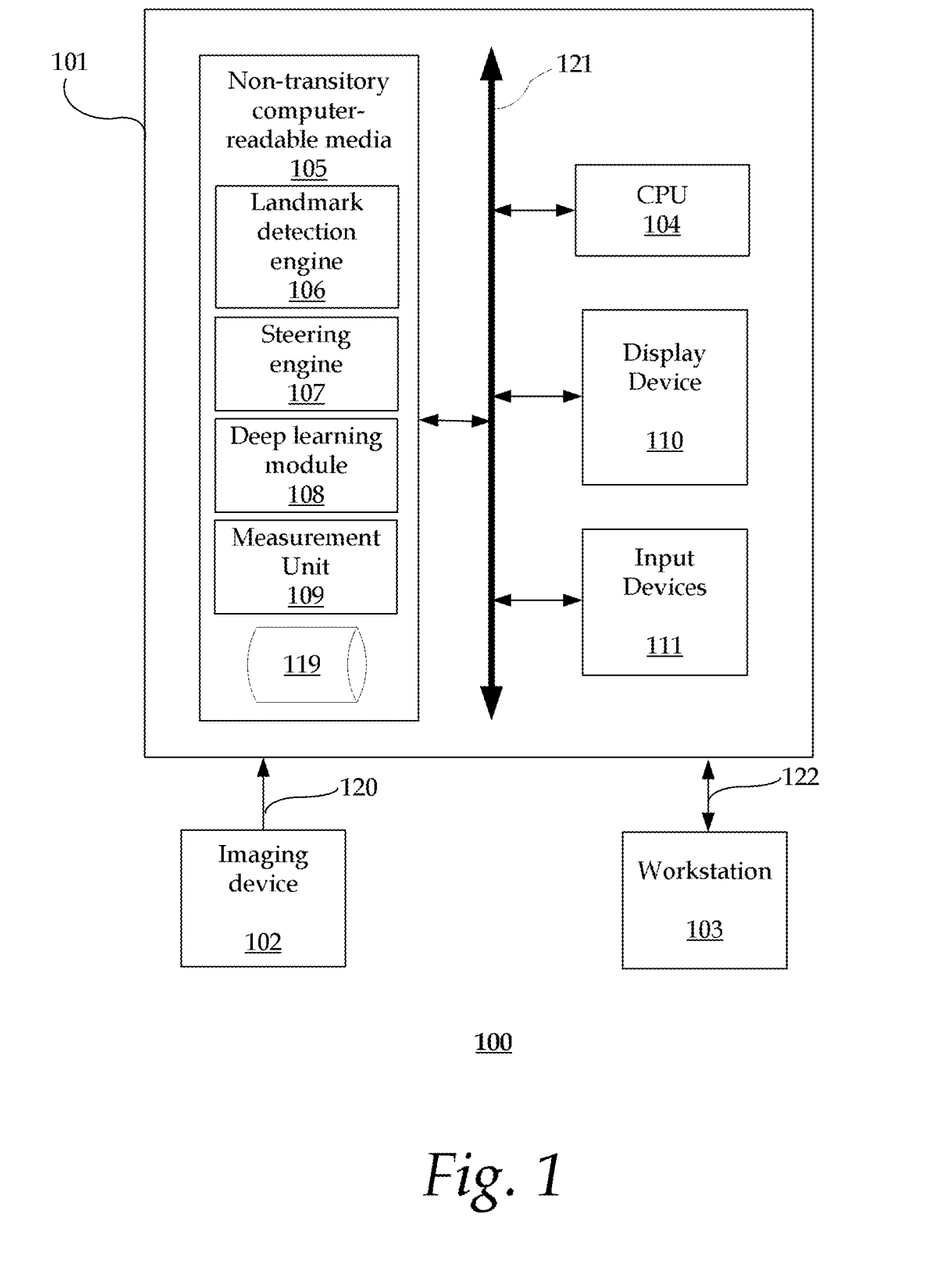
FIG. 1 is a block diagram illustrating an exemplary system.

FIG. 1 is a block diagram illustrating an exemplary system 100. The system 100 includes a computer system 101 for implementing the framework as described herein. In some implementations, computer system 101 operates as a standalone device. In other implementations, computer system 101 may be connected (e.g., using a network) to other machines, such as imaging device 102 and workstation 103. In a networked deployment, computer system 101 may operate in the capacity of a server (e.g., thin-client server), a cloud computing platform, a client user machine in server-client user network environment, or as a peer machine in a peer-to-peer (or distributed) network environment.

In some implementations, computer system 101 comprises a processor or central processing unit (CPU) 104 coupled to one or more non-transitory computer-readable media 105 (e.g., computer storage or memory), display device 110 (e.g., monitor) and various input devices 111 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in non-transitory computer-readable media 105. In particular, the present techniques may be implemented by landmark detection engine 106, steering engine 107, deep learning module 108, measurement unit 109 and database 119.

Non-transitory computer-readable media 105 may include random access memory (RAM), read-only memory (ROM), magnetic floppy disk, flash memory, and other types of memories, or a combination thereof. The computer-readable program code is executed by CPU 104 to process medical data retrieved from, for example, database 119. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing a database (or dataset) 119. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a cloud platform or system, a picture archiving and communication system (PACS), or any other hospital, medical institution, medical office, testing facility, pharmacy or other medical patient record storage system.

Imaging device 102 acquires medical images 120 associated with at least one patient. Such medical images 120 may be processed and stored in database 119. Imaging device 102 may be a radiology scanner (e.g., MR scanner) and/or appropriate peripherals (e.g., keyboard and display device) for acquiring, collecting and/or storing such medical images 120.

The workstation 103 may include a computer and appropriate peripherals, such as a keyboard and display device, and can be operated in conjunction with the entire system 100. For example, the workstation 103 may communicate directly or indirectly with the imaging device 102 so that the medical image data acquired by the imaging device 102 can be rendered at the workstation 103 and viewed on a display device. The workstation 103 may also provide other types of medical data 122 of a given patient. The workstation 103 may include a graphical user interface to receive user input via an input device (e.g., keyboard, mouse, touch screen voice or video recognition interface, etc.) to input medical data 122.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
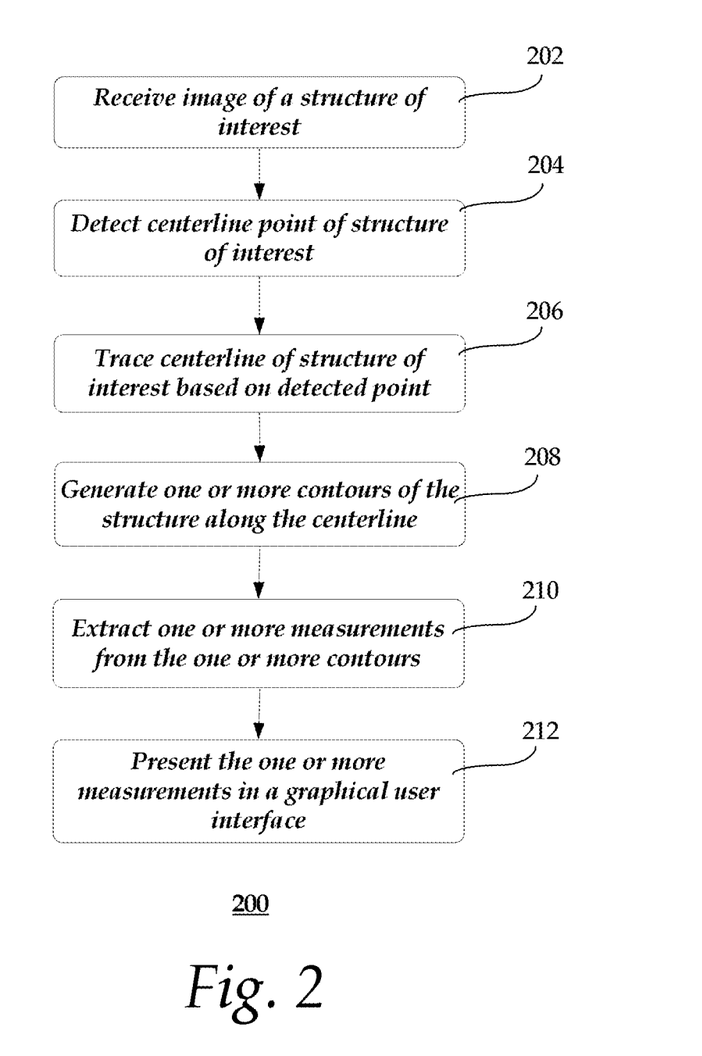
FIG. 2 shows an exemplary method of automated measurement by a computer system.

FIG. 2 shows an exemplary method 200 of automated measurement by a computer system. It should be understood that the steps of the method 200 may be performed in the order shown or a different order. Additional, different, or fewer steps may also be provided. Further, the method 200 may be implemented with the system 101 of FIG. 1, a different system, or a combination thereof.

At 202, landmark detection engine 106 receives an image of a structure of interest from a current patient. The structure of interest may be a vessel or generally tubular structure, such as an aorta, other vascular structure, bronchial airway or vertebra. It should be appreciated, however, that the present framework may also be applied to other anatomical structures. The image may be a three-dimensional (3D) image volume. The image may be retrieved from, for example, database 119 and/or acquired by imaging device 102 from a patient. The image may be acquired by using techniques such as high-resolution computed tomography (HRCT), magnetic resonance (MR) imaging, computed tomography (CT), helical CT, X-ray, angiography, positron emission tomography (PET), fluoroscopy, ultrasound, single photon emission computed tomography (SPECT), or a combination thereof.

Figure 3A:
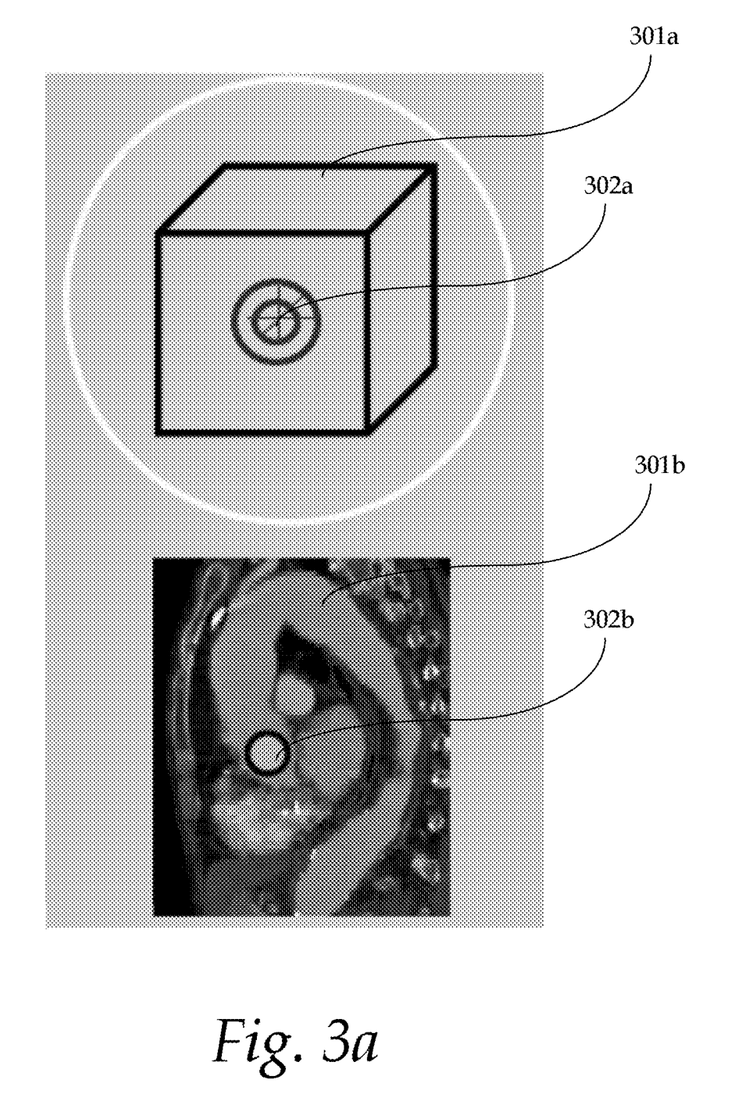
FIG. 3a shows an exemplary schematic diagram and a corresponding image of an aorta.

At 204, landmark detection engine 106 detects a centerline point of the structure of interest in the image. The centerline point lies along the centerline of the structure of interest. FIG. 3a shows an exemplary schematic diagram 301a and a corresponding image 301b of an aorta. The centerline point 302a-b may be detected by the landmark detection engine 106. In some implementations, the landmark detection engine 106 implements a landmark detection algorithm to detect the centerline point. The centerline point 302a-b may be an anatomically significant point, such as the aortic root or the iliac bifurcation.

Returning to FIG. 2, at 206, steering engine 107 traces the centerline of the structure of interest in the image based on the detected centerline point. The centerline may be represented by the set of locations detected by the steering engine 107. The detected centerline point may be used as a starting seed point for tracing the centerline. The steering engine 107 may include, for example, a regression forest-based orientation detector that has been trained to trace the centerline. Other types of trained detectors are also useful.

Figure 3B:
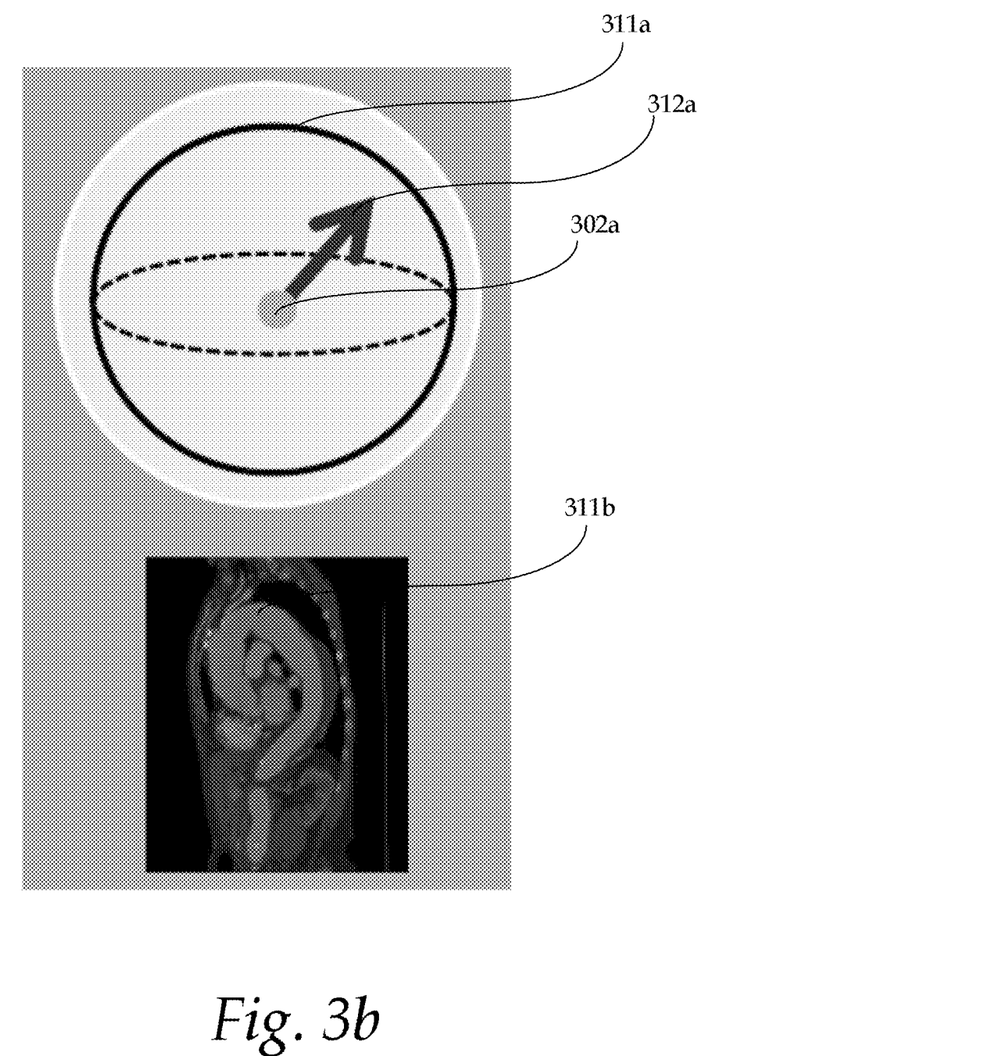
FIG. 3b shows another exemplary schematic diagram and a corresponding image of an aorta.

FIG. 3b shows an exemplary schematic diagram 311a and a corresponding CT image 311b of an aorta. The steering engine 107 first detects the direction 312a of the aorta centerline at a current point 302a, and then steps to the next point along the detected direction 312a. The centerline point detected by the landmark detection engine 106 may serve as the first current point. The process may be repeated at the next point until the end of the aorta or field-of-view of the image scan is reached. By tracing the aorta centerline in a data-driven way, the present framework advantageously achieves robustness even with variations in (a) appearance of the aorta due to different image scanners, pathologies or presence of non-tissue structures; and (b) shape of the aorta.

Figure 3C:
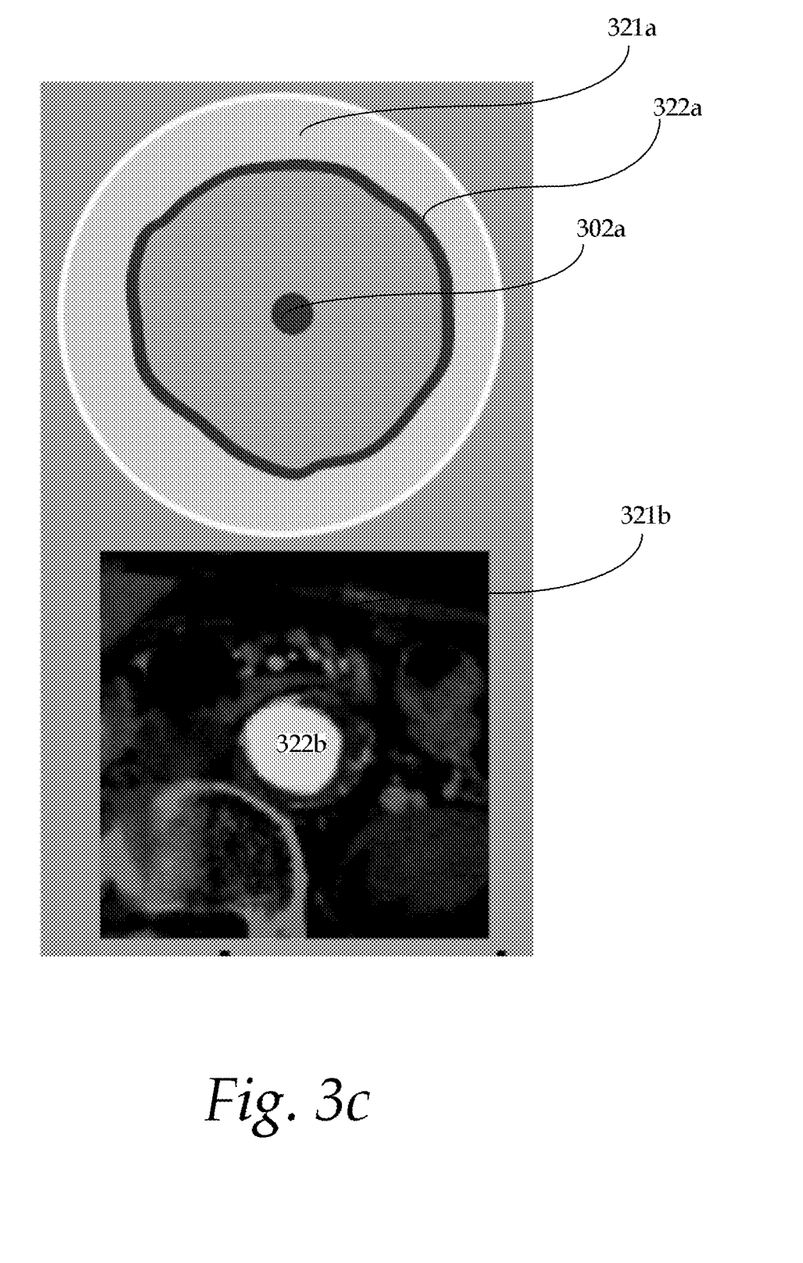
FIG. 3c shows yet another exemplary schematic diagram and a corresponding image of the aorta.

Returning to FIG. 2, at 208, deep learning module 108 generates one or more contours of the structure of interest along the centerline. Each contour defines the cross-sectional area of the structure of interest at a particular point along the centerline. FIG. 3c shows an exemplary schematic diagram 321a of an aorta and a corresponding image 321b of the aorta. The CT image 321b is a cross-sectional oblique image of the aorta extracted from the volumetric image of the aorta. The plane of the CT image 321b is oblique to the orientation (or centerline) of the aorta. The CT image 321b may be located at a predefined point along the centerline. The contour 322a-b of the cross-section of the aorta may be extracted by providing the oblique image 321b to a trained segmentation learning structure implemented by deep learning module 108. In some implementations, the trained segmentation learning structure is an unsupervised learning structure. The trained segmentation learning structure may be a deep learning architecture that includes stacked layers of learning nodes. The learning structure may be represented by, for example, a convolutional neural network (CNN) classifier. CNN is a class of deep, feed-forward artificial neural network that uses a variation of multilayer perceptrons designed to require minimal preprocessing. Other types of classifiers, such as random forests, may also be used.

Figure 4:
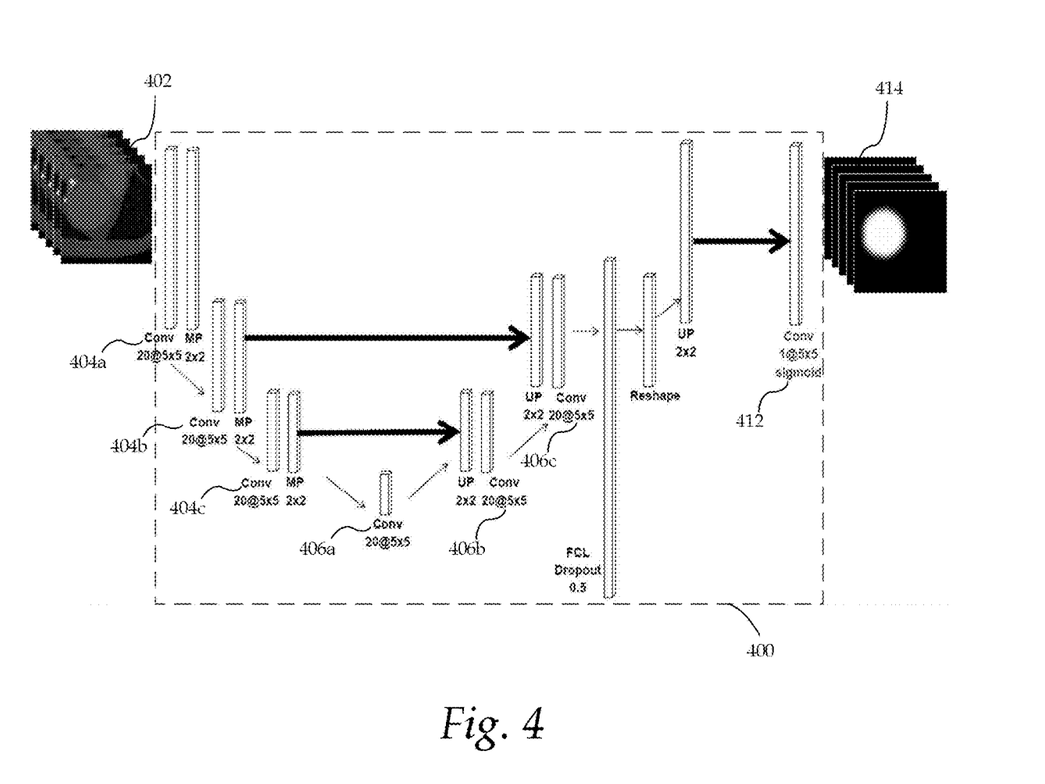
FIG. 4 illustrates an exemplary architecture of a convolutional neural network (CNN)

FIG. 4 illustrates an exemplary architecture of a convolutional neural network (CNN) 400. The white boxes represent copied feature maps while the arrows denote different operations. The x-y size of each feature map is indicated below each box. A set of training images 402 is provided to the CNN 400. The training images 402 may include two-dimensional oblique images extracted from volumetric image data of the aorta from different patients. The training images 402 may include, for example, thousands of square image patches (e.g., 128 pixels×128 pixels) extracted from volumetric images along the lengths of different aortas from different patients. The training images 402 may be pre-processed to create more variations (e.g., small translation and rotation with 15 mm and 10° perturbations).

Figure 5:
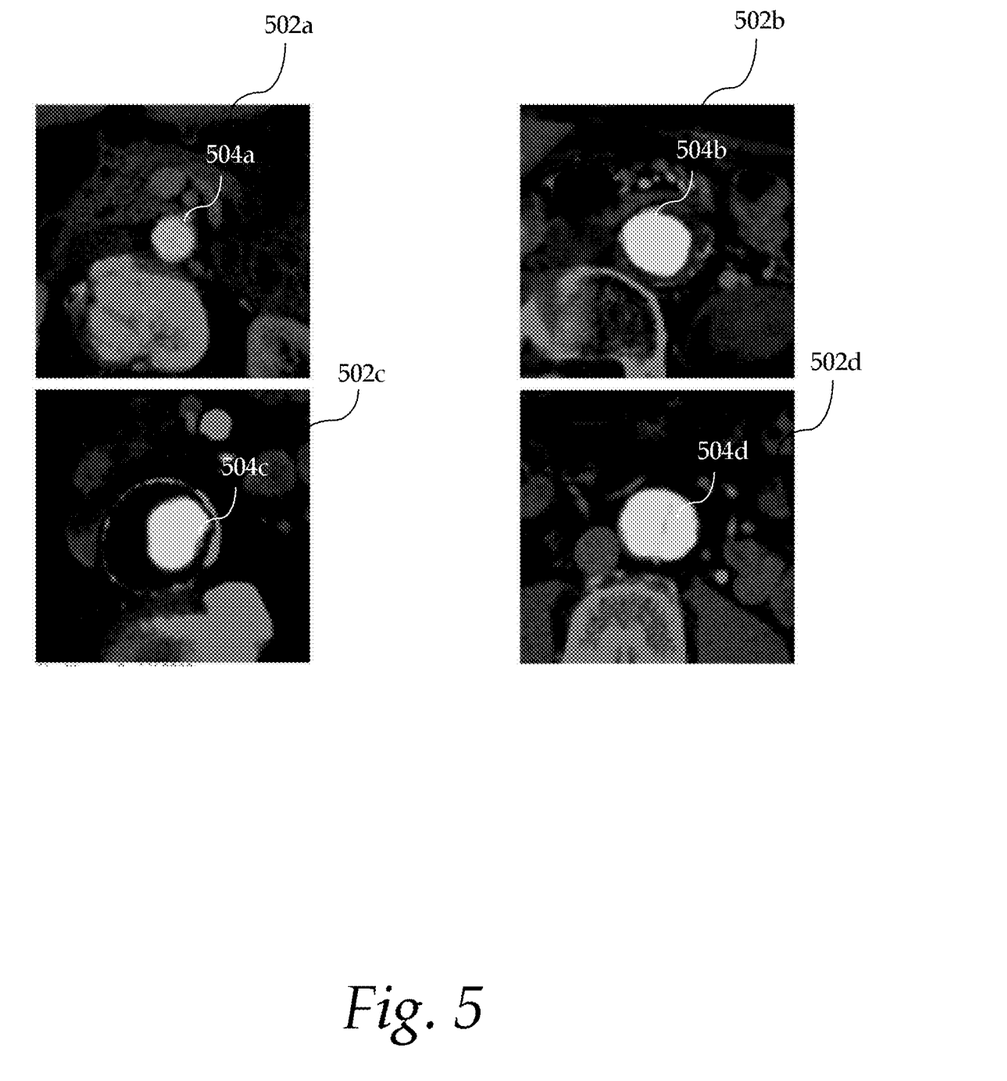
FIG. 5 shows exemplary images with extracted aorta contours.

CNN 400 includes a contracting path (left side) and an expansive path (right side). The contracting path includes repeated application of three 5×5 convolutions (Conv) 404a-c, each followed by a 2×2 max pooling operation (MP). The expansive path includes repeated application of three 5×5 convolutions (Conv) 406a-c, each preceded by a 2×2 upsampling (UP) of the feature map. A dropout layer implemented as a Fully-Connected Layer (FCL) may be provided to prevent overfitting by ignoring a randomly chosen set of nodes in the network (i.e., dropout). A reshaping operation (Reshape) may further be provided to change the dimensions of the data (or tensor). The feature map may be upsampled (UP) before entering the final convolution layer 412. At the final convolution layer 412, a 5×5 convolution is used to map the feature map to the desired number of output images 414. The output images 414 include the contours of the aorta extracted from the training images 402. FIG. 5 shows exemplary images 502a-d with extracted cross-sectional contours 504a-d of the aorta. The aorta contours may be extracted by the deep learning module 108.

Returning to FIG. 2, at 210, measurement unit 109 extracts one or more measurements from the one or more extracted contours. The measurements may be extracted at any point or continuously along the centerline or length of the structure of interest, thereby advantageously reducing the risk of missing important measurements between points. Multiple measurements may be extracted from one or more contours along the centerline of the structure of interest. In addition to the capability of extracting measurements at all points along the length of the structure of interest, measurement unit 109 may also extract measurements at predefined clinically standard points.

Figure 6:
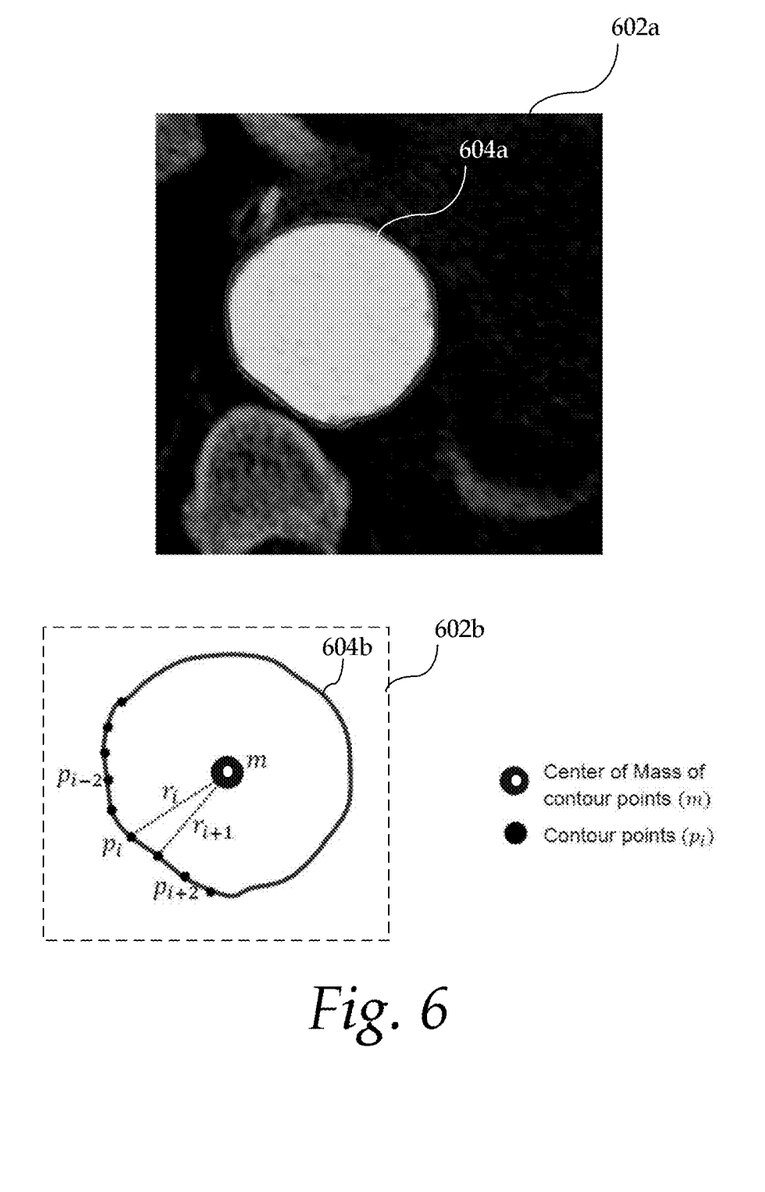
FIG. 6 shows an exemplary image of an aorta and its corresponding schematic diagram.

The measurements may include the maximum diameter of the contour, the diameter of the contour perpendicular to the axis along the maximum diameter, the average diameter of the contour and/or the area defined by each contour. Other types of measurements may also be extracted. FIG. 6 shows an exemplary image 602a of an aorta and its corresponding schematic diagram 602b. The contour 604a-b of the aorta may be extracted by the deep learning module 108 as described previously. The location of the center of the mass of the contour is denoted by m, while the location of each contour point is denoted by $p_i$ and the distance between the center and the contour point is denoted by $r_i$. Measurement unit 109 may determine the maximum diameter (maxD) as follows:

$$\mathrm{max}D = \|p_{imax} - \hat{p}\| \quad (1)$$

wherein $$\hat{p} = arg\ \mathrm{max}_{i_j}\ \mathrm{angle}(p_{imax}, p_i) \quad (2)$$

and $imax = arg\ \mathrm{max}_i r_i$ (3)

The average diameter (avgD) may be determined as follows:

$$avgD = \frac{2}{N}\sum_{i=1}^{N}\|p_i - m\| \quad (4)$$

The area defined by the contour (area) may be determined as follows:

$$\mathrm{area} = \Sigma_{i=1}^{N-2} \tfrac{1}{2}\|p_i - p_{i+1}\| \cdot \|p_i - m\| \quad (5)$$

Returning to FIG. 2, at 212, measurement unit 109 presents the one or more measurements in a graphical user interface. The graphical user interface may enable comparison of the one or more measurements to a population of such measurements extracted offline from populations of patients to determine relevant information about the state of the structure of interest. Measurements that are outside the statistical bands of population measurements may be detected and further studied for possible presence of abnormalities or any complications that may arise due to such abnormalities. Measurement unit 109 may also enable (a) studies across populations (e.g., sex, age, or geographical locations), (b) longitudinal tracking and study of the structure of interest, (c) planning pre- or intra-operative interventions, and/or (d) customization of graft design.

The graphical user interface may enable (a) overlaying of current measurements with corresponding population measurements in a single measurement panel, and (b) linking of measurement panels with image visualization panels. The corresponding population measurements may be determined offline from a population of patients. In some implementations, the graphical user interface enables parametrized visualization of the measurements continuously along the structure of interest or at predefined locations along the structure of interest. The measurements may also be overlaid with corresponding images (e.g., MR, CT, ultrasound images) or text associated with the structure of interest.

Figure 7:
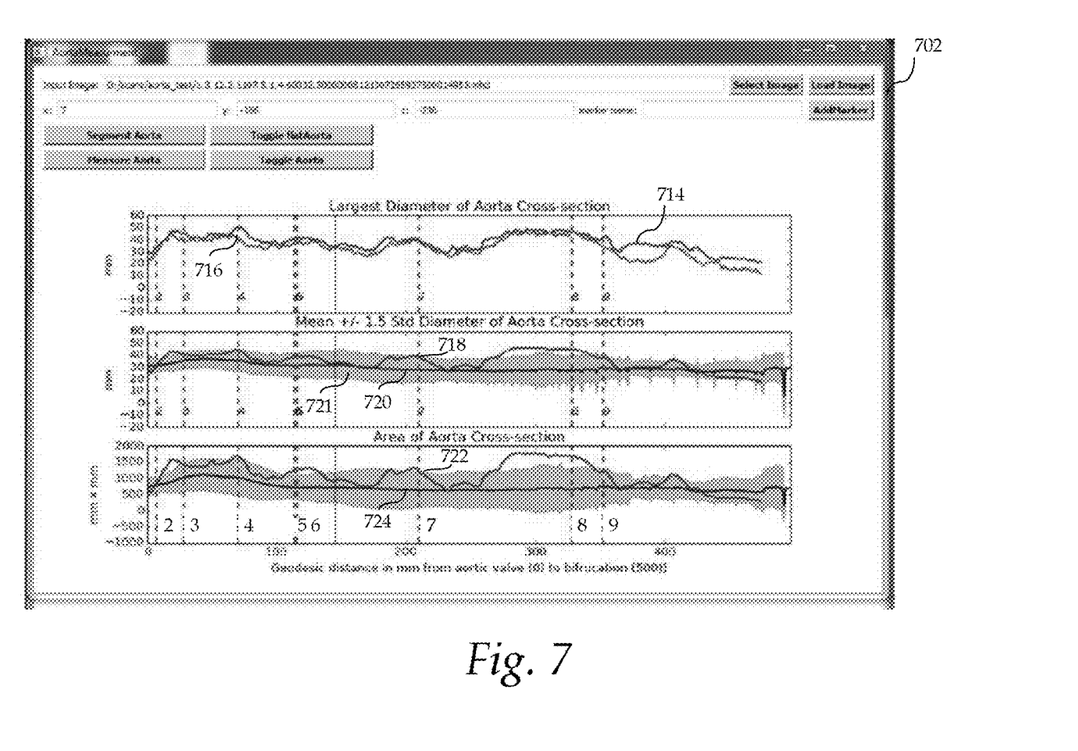
FIG. 7 shows an exemplary measurement panel.

FIG. 7 shows an exemplary measurement panel 702. The measurement panel 702 shows three sets of graphs of measurements extracted from the cross-sectional contours of the aorta. Each graph represents a continuous profile of the measurements along the aorta. Measurements at clinically standard locations along the length of the aorta are indicated by vertical broken lines 2-9. The continuous profile provides a canonical representation that can be easily studied to detect any abnormality (e.g., dilation and growth of the aorta, plaque formation) along the aorta. Locations of interest are indicated by vertical broken lines 2-9.

Graph 714 shows the largest diameter of the aorta cross-sectional contour of the current patient at different continuous positions along the length of the aorta. Graph 714 is overlaid with another graph 716 that represents the diameter that is orthogonal to the axis of the largest diameter of the aorta cross-sectional contour. The graphs 714 and 716 advantageously enable comparison of the diameters along the aorta or at predefined landmarks or locations of interest (e.g., clinically standard locations indicated by vertical broken lines 2-9). There may be multiple pairs of graphs 714 and 716 to represent measurements extracted based on images acquired at different time points to enable visualization of temporal changes in the diameters. This facilitates longitudinal monitoring and detection of abnormal increase in diameters along the aorta.

Graph 718 represents the mean diameter of the cross-sectional contour along the length of the aorta of the current patient, while graph 720 shows the average diameter of the cross-sectional contour along the length of the aorta as determined from a population of patients. The graphs 718 and 720 advantageously enable comparison of the mean and average diameters along the aorta or at predefined landmarks or locations of interest (e.g., clinically standard locations indicated by vertical broken lines 2-9). The shaded region 721 represents the standard deviation of the population measurement values (i.e., error bands). Any other statistical measure may also be generated and displayed. This visualization facilitates the detection of any abnormal dilation of the aorta.

Graph 722 represents the area of the cross-sectional contour along the length of the aorta, while graph 724 represents the average area of the cross-sectional contour along the length of the aorta as determined from a population of patients. The graphs 722 and 724 advantageously enable comparison of the areas of the cross-sectional contour along the aorta or at predefined landmarks or locations of interest (e.g., clinically standard locations indicated by vertical broken lines 2-9).

Figure 8:
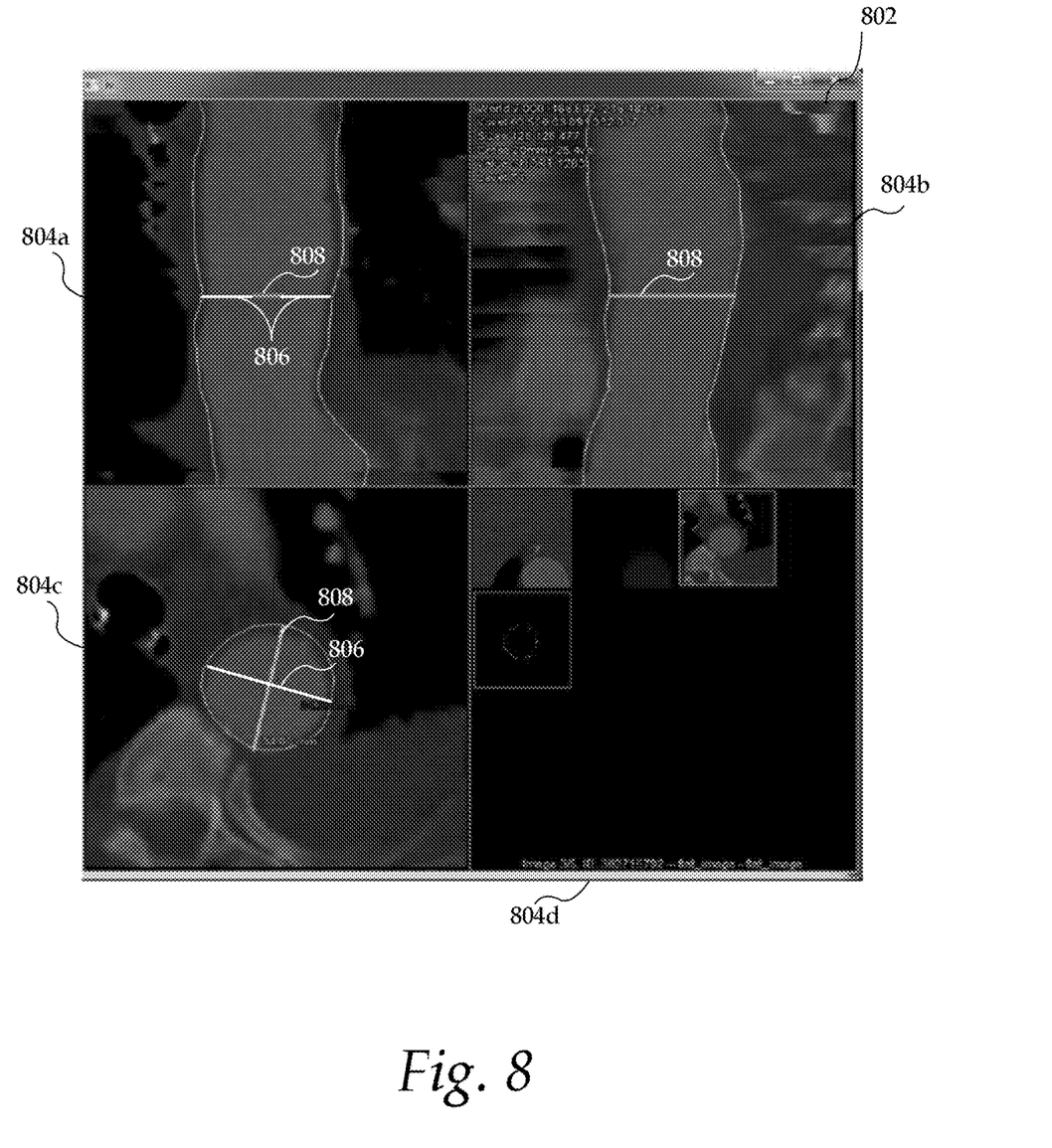
FIG. 8 shows an exemplary image visualization panel.

FIG. 8 shows an exemplary image visualization panel 802. The image visualization panel 802 is linked to the measurement panel 702 shown in FIG. 7. The user interface may present the image visualization panel 802 next to the measurement panel 702 on a single display screen to facilitate study of the aorta. When a point on the graph 714, 718 or 722 displayed by the measurement panel 702 is selected by a user (e.g., mouse click or screen touch), the corresponding set of images 804a-d of the aorta at the selected location along the aorta is displayed in the image visualization panel 802. Images 804a, 804b and 804c show the coronal, sagittal and axial views of the aorta respectively. Line 806 represents the largest diameter of the aorta cross-sectional contour, while line 808 represents the diameter in the orthogonal direction to the largest diameter of the aorta.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A system for automated measurement, comprising:
    a non-transitory memory device for storing computer readable program code; and
    a processor device in communication with the memory device, the processor being operative with the computer readable program code to perform steps including
        receiving an image of an aorta,
        detecting a centerline point of the aorta in the image,
        tracing a centerline of the aorta using the detected centerline point as a starting point,
        generating, by a trained segmentation learning structure, one or more contours of cross-sections of the aorta along the centerline, wherein the trained segmentation learning structure comprises a deep learning architecture trained by two-dimensional cross-sectional images of the aorta,
        extracting one or more measurements from the one or more contours, and
        presenting the one or more measurements in a graphical user interface.

2. The system of claim 1 wherein the processor is operative with the computer readable program code to extract multiple measurements continuously along the centerline of the aorta and present the multiple measurements as a continuous profile along the aorta in the graphical user interface.

3. The system of claim 1 wherein the processor is operative with the computer readable program code to extract multiple measurements at clinically standard points along the centerline of the aorta.

4. The system of claim 1 wherein the processor is operative with the computer readable program code to generate the one or more contours of the aorta along the centerline by
    extracting, from the received image, a cross-sectional image of the aorta, and
    providing the cross-sectional image to the trained segmentation learning structure to generate the one or more contours.

5. The system of claim 1 wherein the processor is operative with the computer readable program code to present the one or more measurements in the graphical user interface by overlaying the one or more measurements with corresponding population measurements in a measurement panel.

6. A method of automated measurement, comprising:
    receiving an image of a structure of interest;
    tracing a centerline of the structure of interest in the image;
    generating, by a trained segmentation learning structure, one or more contours of cross-sections of the structure of interest along the centerline, wherein the trained segmentation learning structure comprises a deep learning architecture trained by two-dimensional cross-sectional images of the structure of interest;
    extracting one or more measurements from the one or more contours; and
    presenting the one or more measurements in a graphical user interface.

7. The method of claim 6 wherein tracing the centerline of the structure of interest comprises:
    detecting a centerline point of the structure of interest; and
    tracing the centerline of the structure of interest using the centerline point as a starting point.

8. The method of claim 7 wherein tracing the centerline comprises using a regression forest-based orientation detector that is trained to trace the centerline.

9. The method of claim 7 wherein tracing the centerline of the structure of interest comprises repeatedly detecting a direction of the centerline at a current point and stepping to a next point along the detected direction.

10. The method of claim 6 wherein generating the one or more contours of the structure of interest along the centerline comprises:
   extracting, from the received image, a cross-sectional image of the structure of interest; and
   providing the cross-sectional image to the trained segmentation learning structure to generate the one or more contours.

11. The method of claim 10 further comprises training the segmentation learning structure using a set of two-dimensional images of different aortas from different patients.

12. The method of claim 10 wherein the trained segmentation learning structure comprises a convolutional neural network classifier.

13. The method of claim 6 wherein extracting the one or more measurements from the one or more contours comprises extracting multiple measurements continuously along the centerline of the structure of interest, and wherein presenting the one or more measurements comprises presenting the multiple measurements as a continuous profile along the structure of interest in the graphical user interface.

14. The method of claim 6 wherein extracting the one or more measurements from the one or more contours comprises extracting a maximum diameter of at least one of the one or more contours.

15. The method of claim 6 wherein extracting the one or more measurements from the one or more contours comprises extracting a diameter perpendicular to an axis along a maximum diameter of at least one of the one or more contours.

16. The method of claim 6 wherein extracting the one or more measurements from the one or more contours comprises extracting an average diameter of the one or more contours.

17. The method of claim 6 wherein extracting the one or more measurements from the one or more contours comprises extracting an area defined by at least one of the one or more contours.

18. The method of claim 6 wherein presenting the one or more measurements in the graphical user interface comprises overlaying the one or more measurements with corresponding population measurements in a measurement panel to detect any abnormal dilation of the structure of interest.

19. The method of claim 6 wherein presenting the one or more measurements in the graphical user interface comprises presenting the one or more measurements in a measurement panel and linking the measurement panel with an image visualization panel.

20. One or more non-transitory computer-readable media embodying instructions executable by machine to perform operations, comprising:
   receiving an image of a structure of interest;
   tracing a centerline of the structure of interest in the image;
   generating, by a trained segmentation learning structure, one or more contours of cross-sections of the structure of interest along the centerline, wherein the trained segmentation learning structure comprises a deep learning architecture trained by two-dimensional cross-sectional images of the structure of interest;
   extracting one or more measurements from the one or more contours; and
   presenting the one or more measurements in a graphical user interface.

* * * * *